US010337576B2

United States Patent
Lin et al.

(10) Patent No.: US 10,337,576 B2
(45) Date of Patent: Jul. 2, 2019

(54) BRAKE PAD WEAR SENSOR

(71) Applicant: TRW AUTOMOTIVE U.S. LLC, Livonia, MI (US)

(72) Inventors: Xing Ping Lin, West Bloomfield, MI (US); David Leonard Juzswik, Commerce Township, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 15/783,080

(22) Filed: Oct. 13, 2017

(65) Prior Publication Data
US 2018/0106320 A1    Apr. 19, 2018

Related U.S. Application Data

(60) Provisional application No. 62/408,883, filed on Oct. 17, 2016.

(51) Int. Cl.
*F16D 66/00* (2006.01)
*F16D 66/02* (2006.01)

(52) U.S. Cl.
CPC ...... *F16D 66/028* (2013.01); *F16D 2066/006* (2013.01)

(58) Field of Classification Search
CPC .......... F16D 66/028; F16D 2066/006
See application file for complete search history.

(56) References Cited

U.S. PATENT DOCUMENTS

| 6,257,374 B1 | 7/2001 | Strzelczyk et al. |
| 7,047,797 B2 * | 5/2006 | Giessler ............... G01L 5/28 324/660 |

(Continued)

FOREIGN PATENT DOCUMENTS

| DE | 102013013280 | 2/2015 |
| EP | 947725 | 1/2002 |

(Continued)

OTHER PUBLICATIONS

PCT/US17/56507 International Search Report and Written Opinion Completed Dec. 8, 2017.

*Primary Examiner* — Pamela Rodriguez
(74) *Attorney, Agent, or Firm* — Tarolli, Sundheim, Covell & Tummino LLP

(57) ABSTRACT

A brake pad wear measuring system for measuring brake pad wear for a vehicle disc brake system includes a first coil excitable to create a first magnetic field, and a first target associated with the first coil. The first coil and the first target are configured for movement relative to each other in response to application of the disc brake system. The relative movement causes the first target to move within the first magnetic field and affect the inductance of the first coil. The brake pad wear measuring system also includes a second coil excitable to create a second magnetic field, and a second target associated with the second coil. The second coil and the second target are configured for movement relative to each other in response to application of the disc brake system. The relative movement causes the second target to move within the second magnetic field and affect the inductance of the second coil. The first coil and the first target are configured so that the inductance of the first coil increases as brake pad wear increases. The second coil and the second (Continued)

target are configured so that the inductance of the second coil decreases as brake pad wear increases.

17 Claims, 11 Drawing Sheets

(56) References Cited

U.S. PATENT DOCUMENTS

| | | |
|---|---|---|
| 2004/0075450 A1 | 4/2004 | Buge et al. |
| 2016/0069662 A1* | 3/2016 | Mullenix .............. G01D 5/22 324/207.15 |

FOREIGN PATENT DOCUMENTS

| | | |
|---|---|---|
| WO | 0179724 | 10/2001 |
| WO | 2014001452 | 1/2014 |

* cited by examiner

BRAKE PAD WEAR SENSOR

RELATED APPLICATION

This application claims the benefit of U.S. Provisional Application Ser. No. 62/408,883, filed on Oct. 17, 2016. The disclosure in this application is hereby incorporated herein by reference in its entirety.

TECHNICAL FIELD

The invention relates generally to brake pad wear sensing systems and devices. More particularly, the invention relates to a brake pad wear sensor that measures wear in both inner and outer brake pads of a disc braking system.

BACKGROUND

It is desirable to sense and inform the driver when automotive brake pads need to be replaced. Known electronic brake wear sensors have a resistor circuit sensor that is clipped to the inner brake pad. As the pad is abraded away by the rotor, the sensor is also abraded away, changing its resistance. A pigtail harness is connected to the sensor which is wired to a sensing module in the vehicle.

There are several problems with the known approach. The multiple wire harnesses required and the additional sensing module makes this an expensive solution. Routing of the harnesses through the vehicle suspension and the wheel/steering knuckle area is very challenging and prone to road debris abuse. Additionally, the wear sensor has to be replaced each time the pads are replaced, which can be expensive.

While employing electronic sensors to detect brake pad wear, it is important to consider that the brake pad and brake caliper area can reach temperatures in excess of 300 degrees C., which many electronic sensors cannot withstand.

From a cost and implementation standpoint, it is desirable to not use any wire harness and to try to utilize existing product already on the vehicle to reduce the cost of transporting the pad wear information to the driver display. It is also desirable that it not be necessary to replace the brake pad wear sensor with the brake pads when they are replaced. It is also desirable that the brake pad wear sensor provides diagnostic (e.g., heartbeat) capabilities, and the sensor must be capable of withstanding the extreme temperatures seen during braking.

SUMMARY

According to one aspect, a brake pad wear measuring system for measuring brake pad wear for a vehicle disc brake system includes a first coil excitable to create a first magnetic field, and a first target associated with the first coil. The first coil and the first target are configured for movement relative to each other in response to application of the disc brake system. The relative movement causes the first target to move within the first magnetic field and affect the inductance of the first coil. The brake pad wear measuring system also includes a second coil excitable to create a second magnetic field, and a second target associated with the second coil. The second coil and the second target are configured for movement relative to each other in response to application of the disc brake system. The relative movement causes the second target to move within the second magnetic field and affect the inductance of the second coil. The first coil and the first target are configured so that the inductance of the first coil increases as brake pad wear increases. The second coil and the second target are configured so that the inductance of the second coil decreases as brake pad wear increases.

According to another aspect, alone or in combination with any other aspect, the brake pad wear measuring system can also include a controller configured to excite the first and second coils to produce the magnetic fields and for measuring the inductance of the first and second coils. The controller can be configured to respond to changes in inductance in the first and second coils caused by movement of the first and second targets target in the magnetic field to provide a signal indicative of brake pad wear.

According to another aspect, alone or in combination with any other aspect, the controller can be configured to calculate a differential between the inductance of the first coil and the inductance of the second coil. The controller can also be configured to determine the brake pad wear in response to the calculated differential.

According to another aspect, alone or in combination with any other aspect, the differential can be a difference between the measured inductances of the first and second coils.

According to another aspect, alone or in combination with any other aspect, the differential can be a ratio of the measured inductances of the first and second coils.

According to another aspect, alone or in combination with any other aspect, the first target can have a face that extends along a first target plane and is oriented parallel with a first winding plane of the first coil. The second target can have a face that extends along a second target plane and is oriented parallel with a second winding plane of the second coil. Movement of the first target relative to the first coil can be along an axis that extends parallel to both the first target plane and the first coil winding plane. Movement of the second target relative to the second coil can be along an axis that extends parallel to both the second target plane and the second coil winding plane.

According to another aspect, alone or in combination with any other aspect, the first and second target planes can be co-planar, and the first and second coil planes can be co-planar.

According to another aspect, alone or in combination with any other aspect, the first and second targets can be configured so that the surface area of the first target overlying the first coil increases in response to brake pad wear, and the surface area of the second target overlying the second coil decreases in response to brake pad wear.

According to another aspect, alone or in combination with any other aspect, the first and second targets can have tapered configurations.

According to another aspect, a brake pad wear measuring system for measuring brake pad wear for a vehicle disc brake system can include a sensor comprising a housing supporting a first coil excitable to create a first magnetic field, a second coil excitable to create a second magnetic field, and a controller configured to excite the first and second coils and to measure the inductance in the first and second coils. A first target can be configured to move within the first magnetic field and affect the inductance of the first coil in response to application of the disc brake system. A second target can be configured to move within the second magnetic field and affect the inductance of the second coil in response to application of the disc brake system. The system can be configured so that movement of the first target in response to brake pad wear causes the inductance of the first coil to increase as brake pad wear increases, and so that movement of the second target in response to brake pad wear causes the inductance of the second coil to decrease as brake pad wear increases.

According to another aspect, alone or in combination with any other aspect, the controller can be configured to respond to changes in inductance in the first and second coils caused by movement of the first and second targets target in the magnetic field to provide a signal from the sensor indicative of brake pad wear.

According to another aspect, alone or in combination with any other aspect, the controller can be configured to calculate a differential between the inductance of the first coil and the inductance of the second coil, the controller being further configured to determine the brake pad wear in response to the calculated differential.

According to another aspect, alone or in combination with any other aspect, the differential can be a difference between the measured inductances of the first and second coils.

According to another aspect, alone or in combination with any other aspect, the differential can be a ratio of the measured inductances of the first and second coils.

According to another aspect, alone or in combination with any other aspect, the first and second coils can be arranged co-planar in the sensor housing and the first and second targets can be arranged co-planar and parallel to the plane of the first and second coils.

According to another aspect, alone or in combination with any other aspect, the first and second targets can be configured so that the surface area of the first target overlying the first coil increases in response to brake pad wear, and the surface area of the second target overlying the second coil decreases in response to brake pad wear.

According to another aspect, alone or in combination with any other aspect, the first and second targets can have tapered configurations.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION

Figure 1:
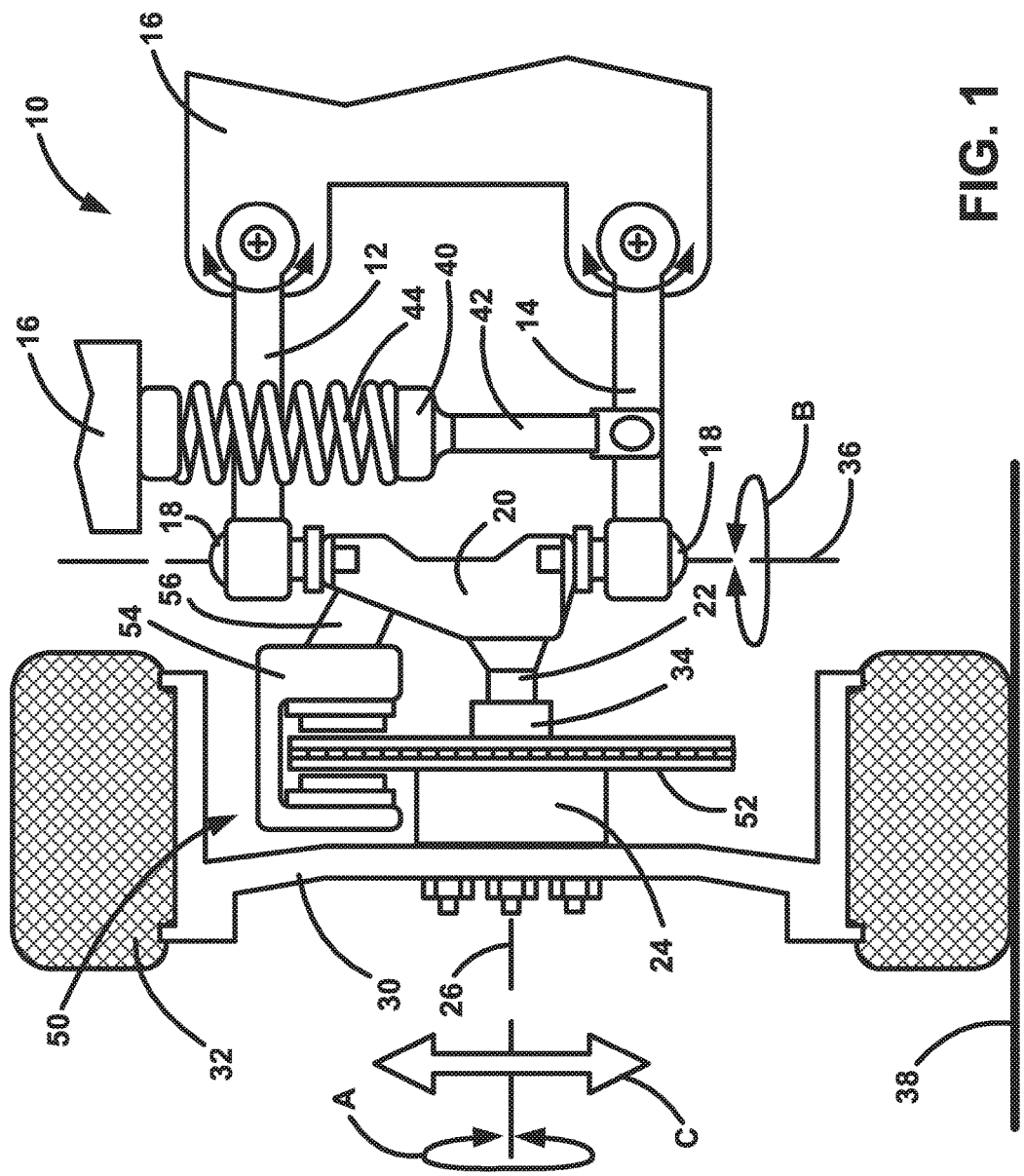
FIG. 1 is a schematic illustration of an example vehicle configuration showing disc brake components mounted on vehicle suspension components.

Referring to FIG. 1, an example vehicle suspension system 10 includes an upper control arm 12 and a lower control arm 14 that are connected to the vehicle 16 for pivoting movement. A steering knuckle 20 is connected to free ends of the control arms 12, 14 by ball joints or the like that permit relative movement between the knuckle and control arms. The steering knuckle 20 includes a spindle 22 that supports a wheel hub 24 for rotation (see arrow A) about a wheel axis 26. A wheel or rim 30 and tire 32 can be mounted on the wheel hub 24 by known means, such as lugs and lug nuts. The wheel hub 24 includes bearings 34 that facilitate rotation of the hub, rim 30, and tire 32 about the axis 26. The steering knuckle 20 is itself rotatable about a steering axis 36 (see arrow B) to steer the vehicle 16 in a known manner.

A damper 40, such as a shock absorber or strut, has a piston rod 42 connected to the lower control arm 14 and a cylinder 44 that is supported by structure of the vehicle 16, such as a vehicle frame-mounted bracket. The damper 40 dampens relative movement of the control arms 14, 16, and the steering knuckle 20 relative to the vehicle 16. The damper 40 can thus help dampen and absorb impacts between the road 38 and the tire 32, such as impacts with bumps, potholes, or road debris, that produce up and down movement (see arrow C) of the suspension system 10, the wheel 30, and the tire 32.

The vehicle 16 includes a disc braking system 50 that includes a brake disc 52 secured to the hub 24 for rotation with the hub, wheel 30, and tire 32. The disc braking system 50 also includes a brake caliper 54 that is secured to the steering knuckle 20 by a bracket 56. The disc 52 and the caliper 54 thus move in unison with the steering knuckle 20 through steering movements (arrow B) and suspension movements (arrow C). The disc 52 rotates (arrow A) relative to the caliper 54 and has an outer radial portion that passes through the caliper.

The configuration of the suspension system 10 shown in FIG. 1 is by way of example only and is not meant to limit the scope of the invention. The brake pad wear sensor system disclosed herein can be configured for utilization with any vehicle suspension configuration that implements disc brakes. For example, while the illustrated suspension system 10 is an independent front suspension, specifically an upper and lower control arm/A-arm (sometimes referred to as a double wishbone) suspension, other independent suspensions can be used. Examples of independent suspensions with which the brake pad wear sensing system can be implemented include, but are not limited to, swing axle suspensions, sliding pillar suspensions, MacPherson strut suspensions, Chapman strut suspensions, multi-link suspensions, semi-trailing arm suspensions, swinging arm suspensions, and leaf spring suspensions. Additionally, the brake pad wear sensing system can be implemented with dependent suspension systems including, but not limited to, Satchell link suspensions, Panhard rod suspensions, Watt's linkage suspensions, WOB link suspensions, Mumford linkage suspensions, and leaf spring suspensions. Furthermore, the brake pad wear sensing system can be implemented on front wheel disc brakes or rear wheel disc brakes.

Figure 2:
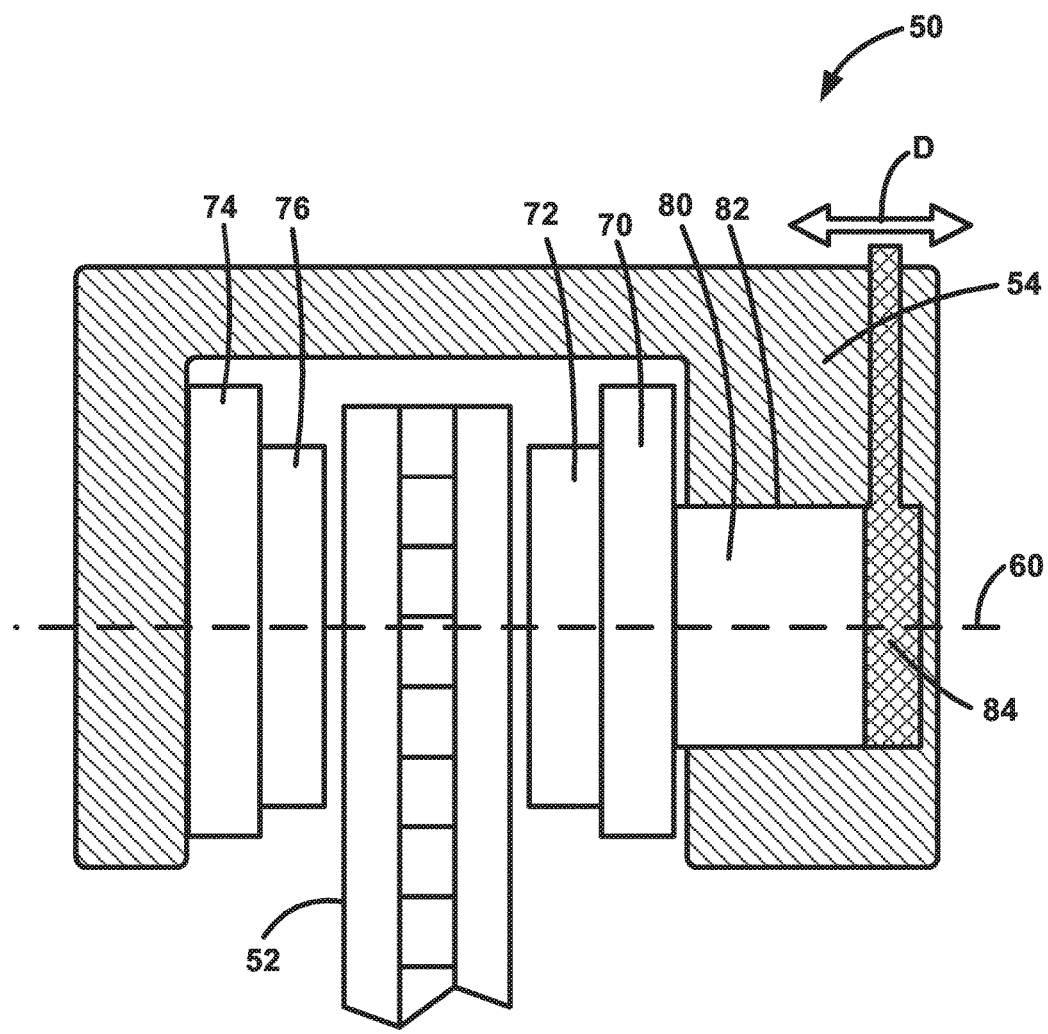
FIG. 2 is a schematic illustration depicting a brake wear sensor system implemented on an example disc brake configuration, wherein the disc brake is shown in a non-braking condition.
Figure 3:
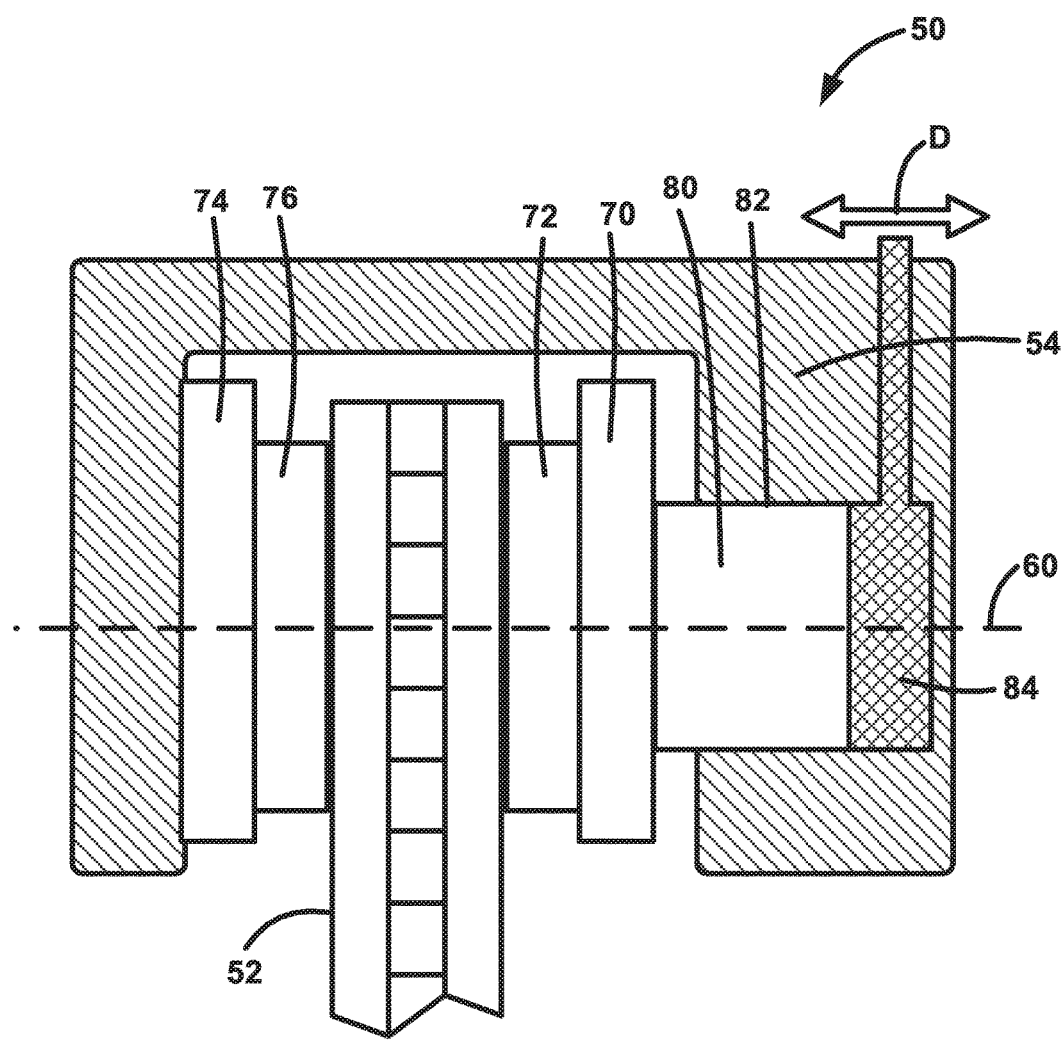
FIG. 3 is a schematic illustration depicting the brake wear sensor system of FIG. 2, wherein the disc brake is shown in a first braking condition with brake pads at a first level of wear.
Figure 4:
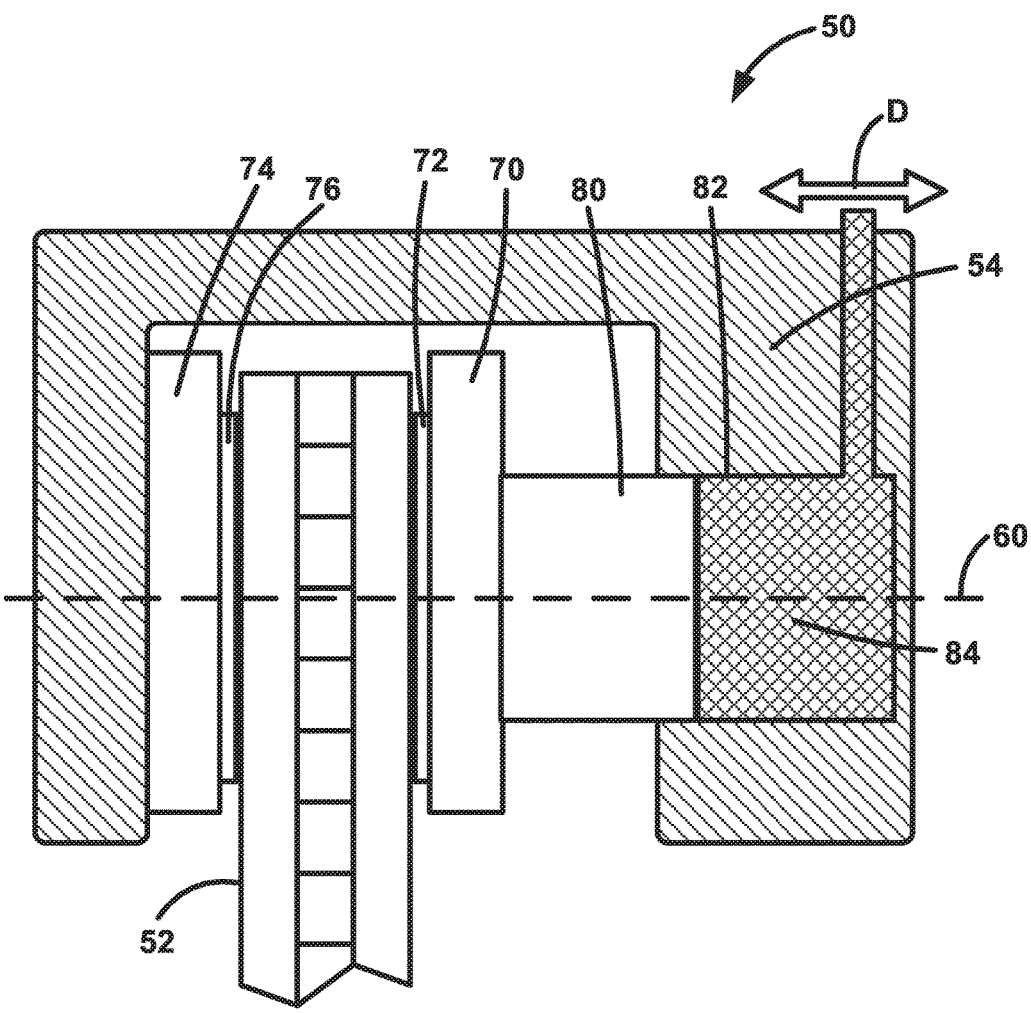
FIG. 4 is a schematic illustration depicting the brake wear sensor system of FIG. 2, wherein the disc brake is shown in a second braking condition with brake pads at a second level of wear.

Referring to FIGS. 2-4, the disc braking system 50 is illustrated schematically and in greater detail. The brake system 50 is a single piston floating caliper system in which the connection of the caliper 54 to the vehicle 16 allows for axial movement of the caliper ("float") relative to the brake disc 52. In this floating caliper configuration, the caliper 54 is permitted to move axially toward and away from the disc 52 (see arrow D) parallel to a braking axis 60.

The brake system 50 includes an inner brake pad holder 70 that supports an inner brake pad 72, and an outer brake pad holder 74 that supports an outer brake pad 76. The inner brake pad holder 70 is supported on a piston 80. The outer brake pad holder 74 is supported on the floating caliper 54. The piston 80 is disposed in a cylinder 82 that is supported on or formed in the floating caliper 54. Brake fluid 84 is pumped into the cylinder 82 in response to driver application of a brake pedal (not shown) in order to actuate the braking system 50.

The brake system 50 is maintained in the unactuated condition of FIG. 2 via bias applied by a biasing member (not shown), such as a spring. When the brake pedal is applied, the brake fluid 84 fills the cylinder 82 and applies fluid pressure to the piston 80, urging it to move to the left, as viewed in FIGS. 2-4. This causes the inner brake pad holder 70 and pad 72 to move along the braking axis 60 toward and the brake disc 52. The inner brake pad 72 engaging the disc 52 creates a reaction force that acts on the floating caliper 54, due to its supporting of the piston 80 and cylinder 82. Since the piston 80 is blocked against movement toward the disc 52 due to the engagement of the inner brake pad 72 with the disc, the brake fluid pressure in the cylinder 82 urges the floating caliper 54 to move to the right, as viewed in FIGS. 2-4. The floating caliper 54, moving to the right, causes the outer brake pad holder 74 and pad 76 to move along the braking axis 60 toward the brake disc 52. The inner pad 76 eventually engages the disc 52, which is now clamped between the inner and outer brake pads.

As the brake pads 72, 76 wear down, they become thinner. This is illustrated by comparing the brake pads 72, 76 of FIG. 3, which are fresh, thick, and unworn, to the brake pads of FIG. 4, which are old, thin, and worn-out. As seen in the comparison of FIGS. 3 and 4, owing to the floating caliper configuration of the brake system 50, both the piston 80 and the caliper 54 travel a greater distance when applying the worn pads of FIG. 4 than they do when applying the unworn pads.

A brake pad wear sensing system 100 measures the amount of wear in the brake pads 72, 76 without destroying any portion of the system. In this manner, there are no portions of the wear sensing system 100 that require replacement during routine maintenance and brake pad replacement. The wear sensing system 100 achieves this by measuring directly the distance that braking components travel during brake application. When the brake pads are new, the travel distance is short. As the pads wear, the travel distance increases. By measuring and monitoring this travel distance, the wear sensing system 100 can determine both the degree of brake pad wear and the point at which the pads are considered to be worn out.

The travel distance can be measured via a variety of the brake system 50 components. For example, the travel distance can be measured via the pads 72, 76 themselves, the pad holders 70, 74, the floating caliper 54, or the piston 80. The travel distance can be measured between the moving components themselves, or between a moving component and a stationary component. The stationary component can be a component of the brake system 50, or a component of the vehicle 16, such as the suspension system 10. When the brake pads 72, 76 are new or unworn, the travel distances are comparatively small. As the brake pads 72, 76 wear, the travel distances increase. An increase in the travel distance is indicative of the wear on the brake pads.

Figure 5A:
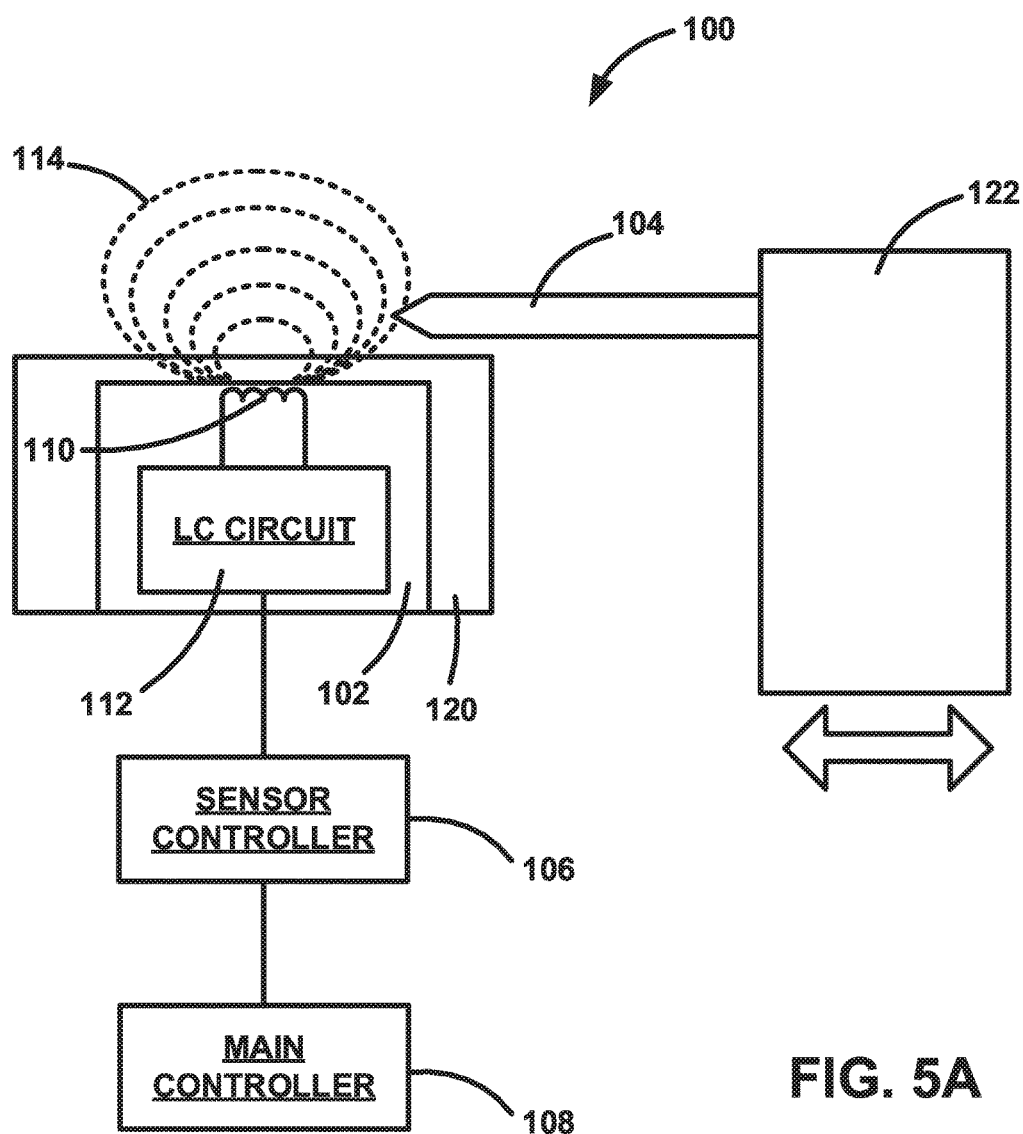
FIGS. 5A and 5B are schematic illustrations depicting one configuration of the brake wear sensor system.
Figure 5B:
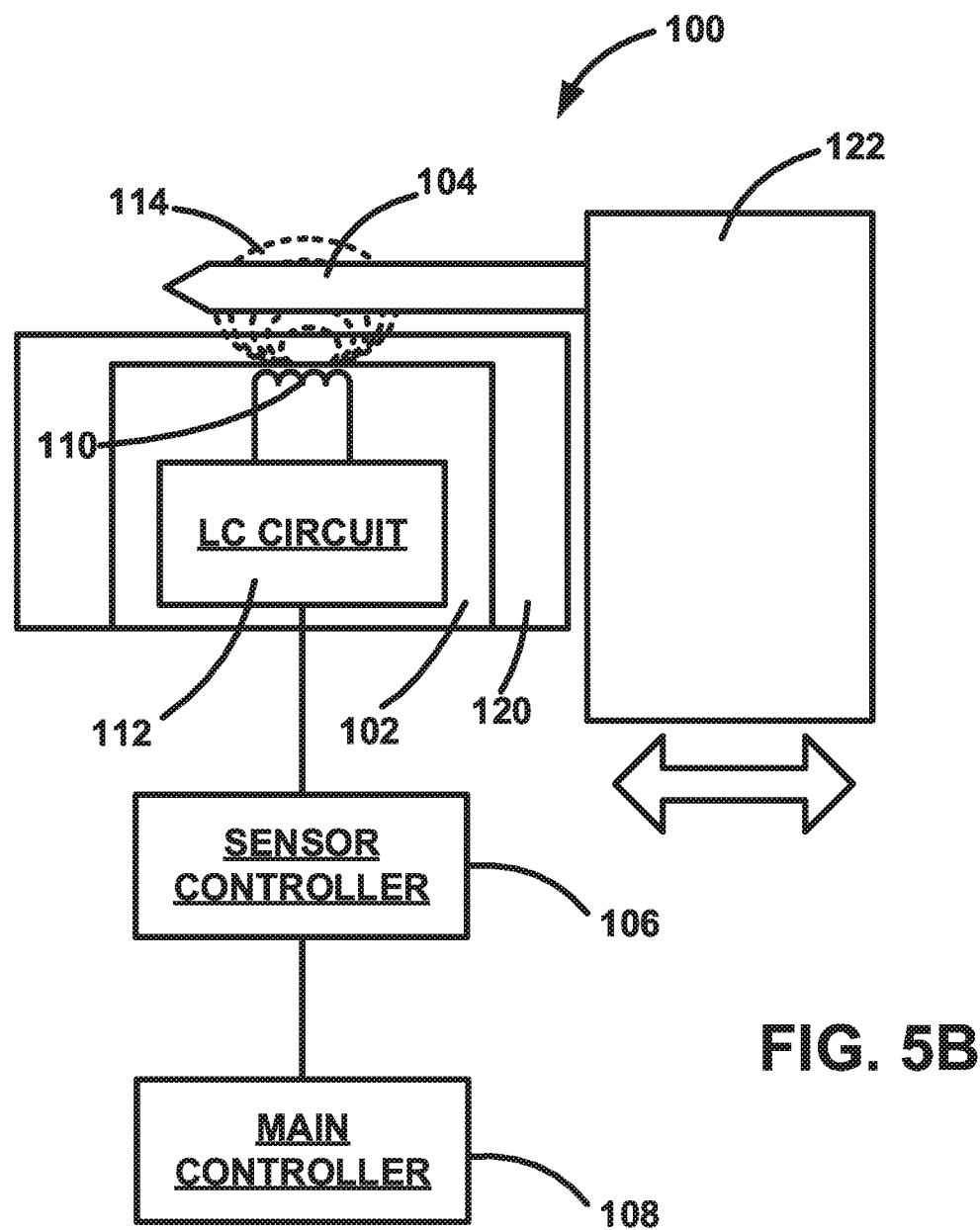

Referring to FIGS. 5A-B, the brake pad wear sensor system 100 includes an inductive sensor 102 and a target 104. The sensor 102 is mounted on a first component 120. The target 104 is mounted on a second component 122. As described in the previous paragraph, the first and second components 120, 122 can have various identities, such as a brake system 50 component, a vehicle 16 component, and a suspension system 10 component. The sensor 102 and target 104 can be mounted for movement in response to brake application (see the arrows in FIGS. 5A-B) or to remain stationary during brake application, as long as at least one component, the sensor 102 and/or the target 104, moves in response to brake application.

The Inductive Sensor

Due to its not being influenced by dirt and corrosion and not requiring physical contact, the inductive sensor 102 is ideal for implementation in the brake pad wear sensing system 100. Inductive proximity sensing can be implemented as a binary indication, i.e., in an "yes/no" configuration, that provides a "time to replace" indication for the brake pads 72, 76. Inductive proximity sensing can also be implemented as a wear indicator, i.e., with a variable output configuration that can provide, for example, a "percent worn" indication, as well as a "time to replace" indication, for the brake pads 72, 76.

Referring to FIGS. 5A and 5B, the sensor 102 includes an inductive coil 110 and an LC circuit 112 for exciting the coil and for detecting the target 104. The LC circuit 112 includes an inductor-capacitor (LC) tank circuit and an oscillator for pumping the LC tank circuit. The inductor of the LC tank circuit is the coil 110, which produces a magnetic field 114 when the oscillator pumps the LC tank circuit. When the target 104 is distant from the sensor 102 (see FIG. 5A), the actuator has little or no effect on the field 114 produced by the sensor 102. As the target 104 is brought near the coil (see FIG. 5B), eddy currents form in the conductive metal of the actuator. The magnitude of the eddy currents varies as a function of the distance, the material, and the size of the target 104. The eddy currents form an opposing magnetic field that has the effect of reducing the oscillation amplitude in the LC tank circuit and reduce the effective inductance of the L inductor.

The inductance value L determines the LC tank resonating frequency. The sensor 102 can be configured to measure either the oscillator amplitude change at LC tank circuit or LC tank resonating frequency change. The LC circuit 112 is configured to measure this change in order to detect the target 104. The manner in which the sensor 102 detects the target 104 depends on the configuration of the LC circuit 112. In one configuration, the LC circuit 112 can be configured to detect the presence of the actuator, i.e., a yes/no switch that is toggled when the target 104 reaches a certain predetermined position relative to the sensor. In another configuration, the LC circuit 112 can be configured to determine the actual distance to the target 104.

The brake pad wear sensor system 100 of the example configuration of FIGS. 5A and 5B can be configured as a worn pad detector (presence detector) or a pad wear detector (distance detector). In a worn pad detector configuration, the system 100 is configured to detect only when the brake pads have reached a predetermined amount of wear and to provide an indication that the pads are worn and require servicing. In a pad wear detector configuration, the system 100 is configured to detect the amount of the wear on the pads (e.g., % wear) and to provide an indication of that amount, such as the amount of wear on the pads or the useful life remaining in the pads. The system 100 can be configured to provide periodic warnings as the pads are worn, such as "50% remaining," "25% remaining," "10% remaining," and "service required."

In operation, when the position of the target 104 changes relative to the piston of the sensor 102, i.e., from the position illustrated in FIG. 5A to the position illustrated in FIG. 5B, this causes the magnetic field 114 to change and the LC circuit 112 to respond, with the sensor 102 providing an output to a sensor controller 106, which performs relevant calculations to determine brake pad wear and whether the brake pads require replacement. It should be noted that, depending on the placement of the sensor 102 and target 104, the wear sensing system 100 can be configured to detect increased wear as a function of increased distance between the sensor and the target, or to detect increased wear as a function of decreased distance between the sensor and the target. The sensor controller 106 can provide the results of these calculations to a main controller 108, such as a vehicle body control module (BCM), which can alert the vehicle operator when necessary.

In one particular configuration, the controller 106 can be implemented in or along with a vehicle anti-lock braking system (ABS) controller. This can be convenient because the ABS system, employing tire rotation sensors, already requires that cables/wiring be routed to the area, which the brake pad wear sensing system 100 can take advantage of. Implementing the controller 106 in/along with the ABS controller is also convenient since it communicates with a main controller 108. In this manner, the brake pad wear indications sensed by the system 100 can be transmitted to the main controller 108 via the sensor controller 106, which can provide the relevant alerts/indications to the vehicle operator, for example, via the instrument panel/gauge cluster.

In another configuration, the sensor 102 can transmit pad wear data wirelessly to the controller 106, which can then relay the data and/or calculations made using the data to the main controller 108. In this configuration, for example, the sensor controller 106 can be implemented in or along with a tire pressure monitoring system (TPMS) controller which is already outfitted to receive wireless signals from TPMS sensors and to communicate with the main controller 108.

In a further configuration, the sensor controller 106 can be integrated in the sensor 102 itself, and the sensor can transmit pad wear data and/or calculation results directly to the main vehicle controller 108, either wired or wirelessly.

The first and second components 120, 122 to which the sensor 102 and target 104 can be mounted can have a variety of identities. Referring to FIGS. 1-4, the first component 120 can be the floating caliper 54, which would allow the sensor 102 to move in response to application of the brakes. Alternatively, the first component 120 can be a stationary component, such as the mounting bracket 56 or a component of the suspension system 10. The second component 122 can be a moving brake system component, such as the caliper 54, the piston 80, one of the pad holders 70, 74, or one of the pads 72,76.

Because effective measurement of the target distance from the inductive sensing coil ($D_S$) is associated with the coil size/diameter, it follows that the larger the coil 110, the better the measurement. Due to the limited space in the area of the brake system 50, and owing to the fact that there are many metal components in that area, a large size/diameter coil may not be possible. Additionally, brake pad thickness can change relatively little (e.g., about 10-15 mm) over its lifetime. This limited space for the sensor 102 and relatively small distance $D_S$, in combination with some tolerance stack up related to surrounding structures, such as vehicle, brake, and suspension components, it can be challenging to sense a small change in axial distance between the sensor 102 and the target 104.

As shown in the example configuration of the sensor system 100 of FIGS. 5A and 5B, the brake pad thickness can be translated into a lateral position of the target 104 relative to the sensor 102 and coil 110. Instead of measuring the axial distance between the face of the coil 110 and the face of the target 104, the spacing between the coil and target faces is maintained constant, and the target is configured to move laterally over the coil. As the target 104 moves relative to the coil 110, the surface area of the target in the vicinity of the field 114 changes. The reduction in coil inductance resulting from the movement of the target 104 over the coil 110 can be measured, for example as a resonating frequency increase in the parallel resistance of the LC circuit or reduced signal amplitude, and used to indicate the position of the target relative to the coil, which can be correlated to a change in thickness (and wear) of the associated brake pad.

Figure 6A:
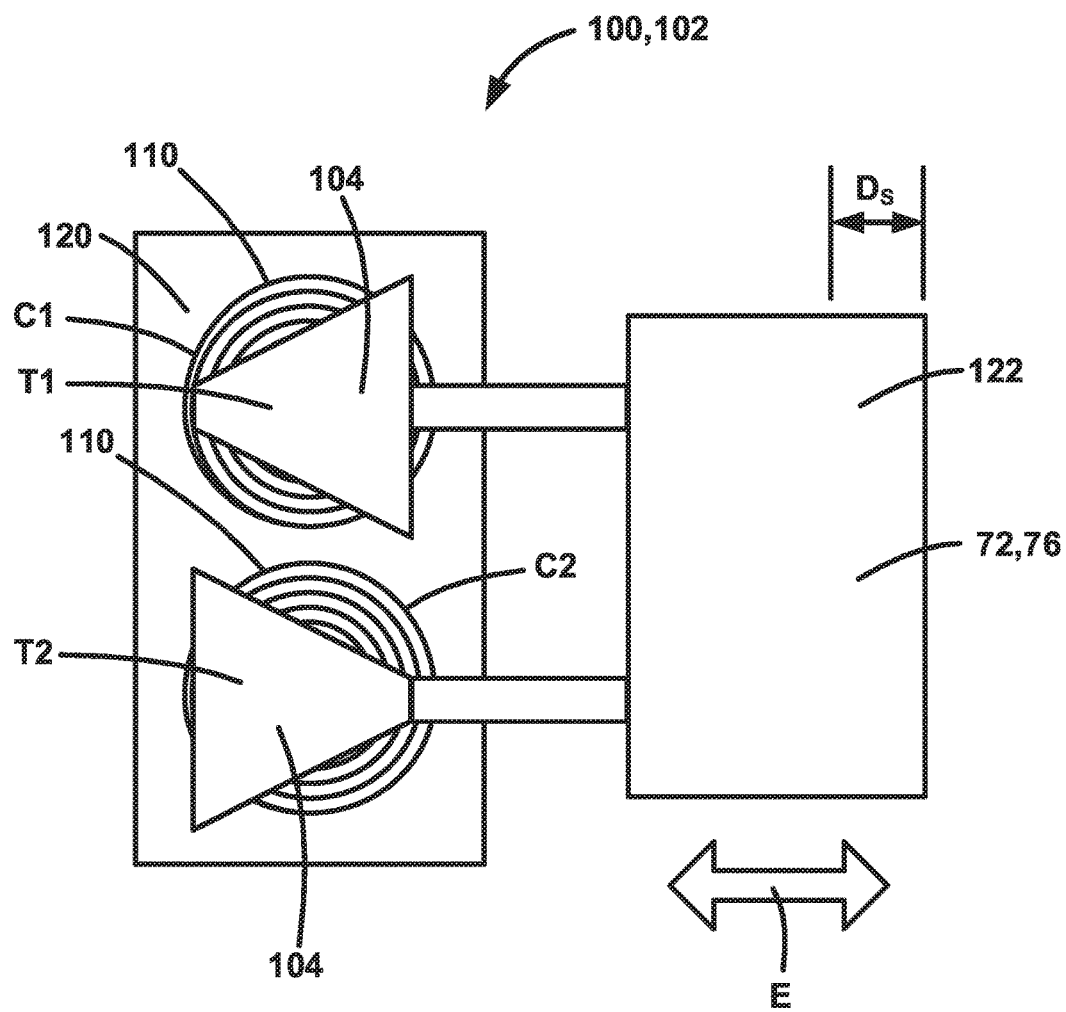
FIGS. 6A and 6B are schematic illustrations depicting another configuration of the brake wear sensor system.
Figure 6B:
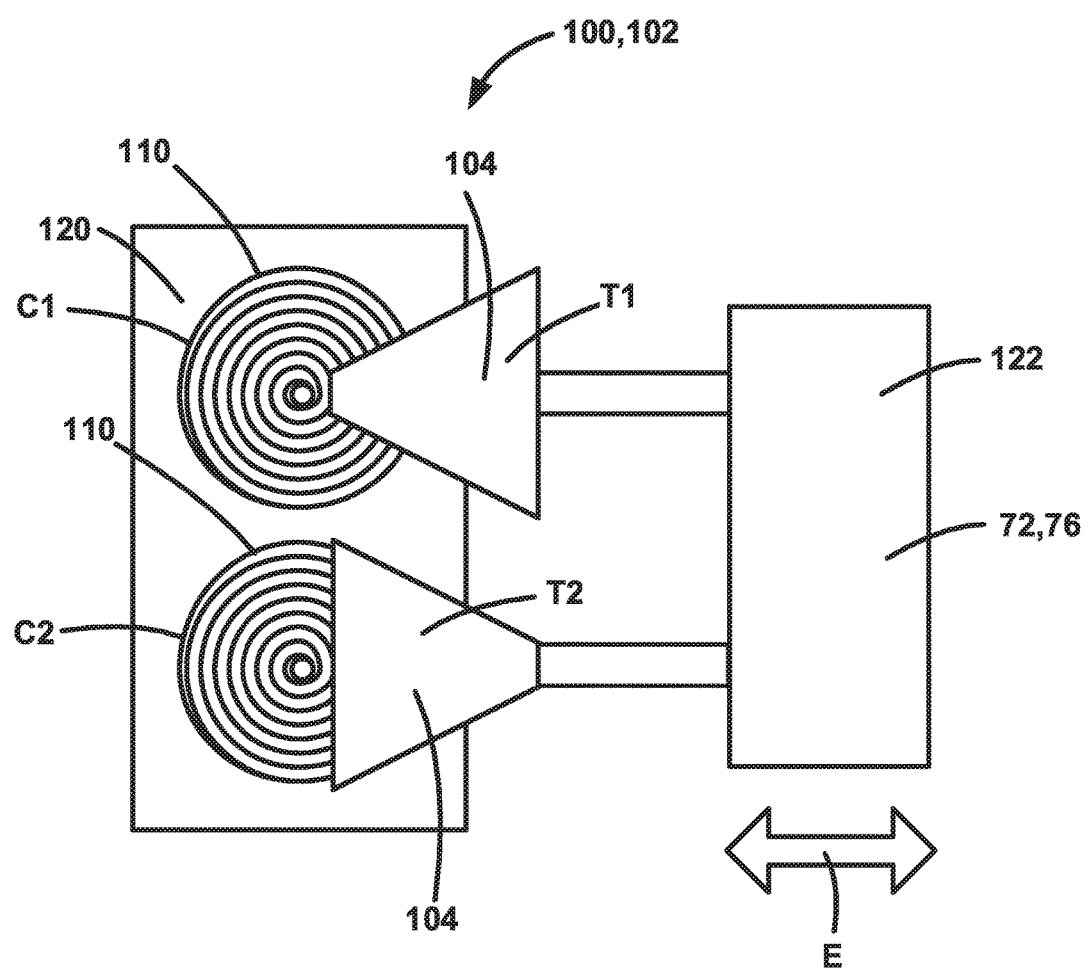

Referring to FIGS. 6A and 6B, in one particular configuration of the sensor system 100, the sensor 102 can include two coils 110, each having its own dedicated target 104. Each of the targets 104 can have an irregular, generally triangular shape and is configured to move laterally (as indicated by arrow E) over its corresponding sensor coil 110 in response to brake actuation.

The irregular shapes of the targets 104 and the fact that their spacing from the surface of the sensor coil 110 is maintained constant and small improves the response of the sensor 102 to the presence of the target. In this variable target configuration, As shown in FIG. 6A, the area of each triangular target 104 that is exposed to its respective coil 110 changes as it slides/moves over/along the coil. As the target 104 moves relative to the coil 110 eddy currents are generated in the target. As the surface area of the target 104 overlying the coil 110 changes, the eddy currents change. The eddy currents effect the inductance (L) of the coil. More specifically, as the surface area of the target 104 positioned over the coil 110 increases, the eddy currents increase and the inductance L of the coil decreases. The reduction in coil inductance resulting from the movement of the target 104 over the coil 110 can be measured, for example as a resonating frequency increase in the parallel resistance of the LC circuit or reduced signal amplitude, and used to indicate the position of the target relative to the coil, which can be correlated to a change in thickness (and wear) of the associated brake pad.

The configuration of the sensor system 100 illustrated in FIGS. 6A and 6B addresses an issue that can arise in an inductive sensor including a single target and coil. Brake pad wear is measured along the braking axis 60 (see FIGS. 2-4), and the wear is specifically measured as the change in distance that the component 122 (e.g., brake pad 70, 74, brake pad holder 72, 76, brake caliper 54) moves in applying the vehicle brakes. In FIGS. 6A and 6B, the component 122 is illustrated as a brake pad 72, 76 for purposes of example only, so that the change in its thickness between the unworn (FIG. 6A) and worn (FIG. 6B) condition can be illustrated.

As long as the change in movement of the target 104 relative to the coil 110 can be attributed only to brake pad wear, the single sensor configuration can be accurate. Unfortunately, however, there are variables other than brake pad wear that can affect the distance that the component 122 travels during brake application. For example, there are tolerances in the braking system components that can stack up and contribute to inaccurate measurements. The brake pads themselves can move relative to other components, such as the calipers, and therefore can introduce error. Additionally, wear in brake system components and vehicle components other than the brake pads can also contribute to changes in travel distance and result in error.

The configuration of the sensor system 100 in FIGS. 6A and 6B accounts for these sources of error by implementing differential sensing. To do this, the sensor 102 is configured so that the coils 110 and their respective targets 104 provide inverse inductive measurements of the measured distance $D_s$, which is indicative of brake pad wear. To illustrate this, in FIGS. 6A and 6B, the coils 110 are labeled C1 and C2, and the targets are labeled T1 and T2, respectively.

The targets 104 are mirror images of each other and are positioned generally centered and overlying their respective coils 110. More specifically, in the non-worn brake pad condition of FIG. 6A, the targets T1 and T2 are positioned generally centered and overlying their corresponding coils C1 and C2. In the fully-worn brake pad condition of FIG. 6B, the targets T1 and T2 are offset from their corresponding coils C1 and C2. Comparing these positions, it can be seen that, as the brake pad 72, 76 wears, the surface area of the target T1 centered over its coil C1 decreases, while the surface area of the target T2 centered over its coil C2 increases.

Figure 7:
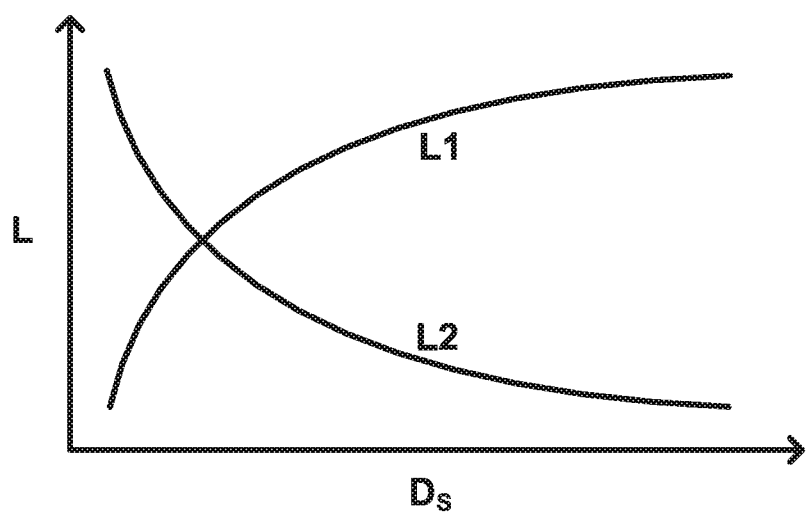
FIG. 7 is a graph illustrating the function of the brake wear sensor system.

As the brake pad 72, 76 wears and gets thinner, both of the targets 104 move in the same direction relative to the coils 110. This movement produces a change in the inductance L1, L2 of the coils C1 C2, which is illustrated in FIG. 7. In FIG. 7, the axis labeled $D_s$ shows brake pad wear increasing to the right along the axis. As shown in FIG. 7, increasing brake pad wear ($D_s$) results in decreased inductance L1 in the coil C1 (decreased target T1 surface area over coil C1), and increased inductance L2 in the coil C2 (increased target T2 surface area over coil C2). Through careful configuration of the targets 104 and coils 110, for any given amount of brake pad wear, the changes in inductance L1 and L2 can be made to be equal and opposite.

Recalling that the coils 110 are implemented in an LC tank circuit as described above, in operation, the sensor 102 can be configured to measure the change in inductance of coils C1 and C2 through the change in amplitude of the oscillator in the LC tank circuit or the change in resonating frequency of the LC tank circuit. Advantageously, sensing system 100 can be configured to measure brake pad wear as a differential between the two coils C1, C2. This can, for example, be as simple as measuring the difference between the measured inductances L1 and L2, or calculating a ratio of the measured inductances L1 and L2, and correlating that difference to brake pad wear. The brake pad measurement can also be an algorithm that utilizes the asymmetrical arrangement of the sensor 102 and differential mode to cancel common mode error.

Sources of error in the axial positions of the sensor system components, i.e., the coils 110 and targets 104, will affect the inductance L1, L2 in the coils equally and oppositely. For example, a shift of the targets T1 and T2 to the right in FIGS. 6A and 6B will cause a decrease in inductance L1 and an increase in inductance L2. A shift of the targets T1 and T2 to the left in FIGS. 6A and 6B will cause an increase in inductance L1 and a decrease in inductance L2. The differential reading between the two coils C1 and C2 will be unaffected by the axial position errors.

Figure 8A:
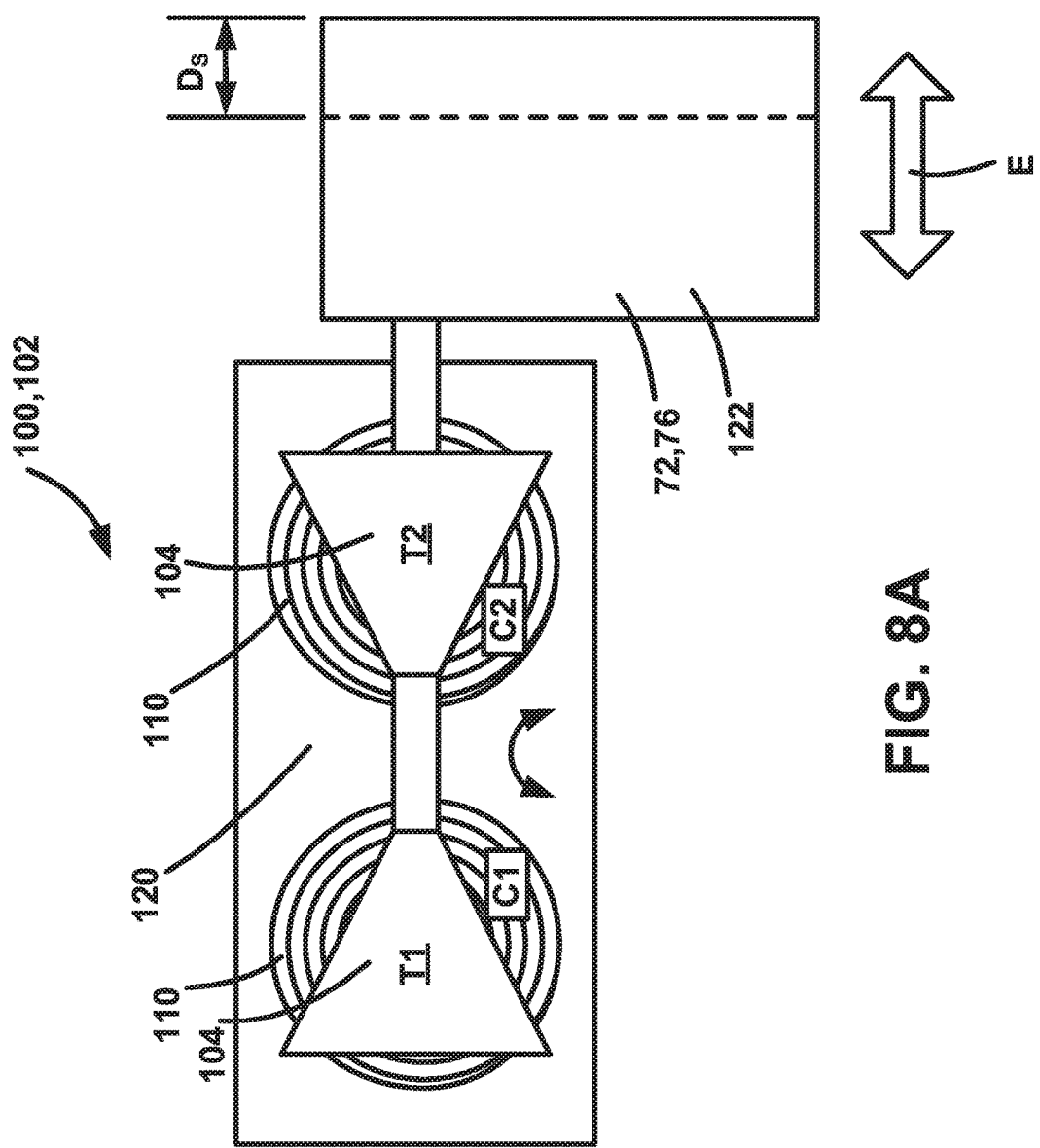
FIGS. 8A and 8B are schematic illustrations depicting another configuration of the brake wear sensor system.
Figure 8B:
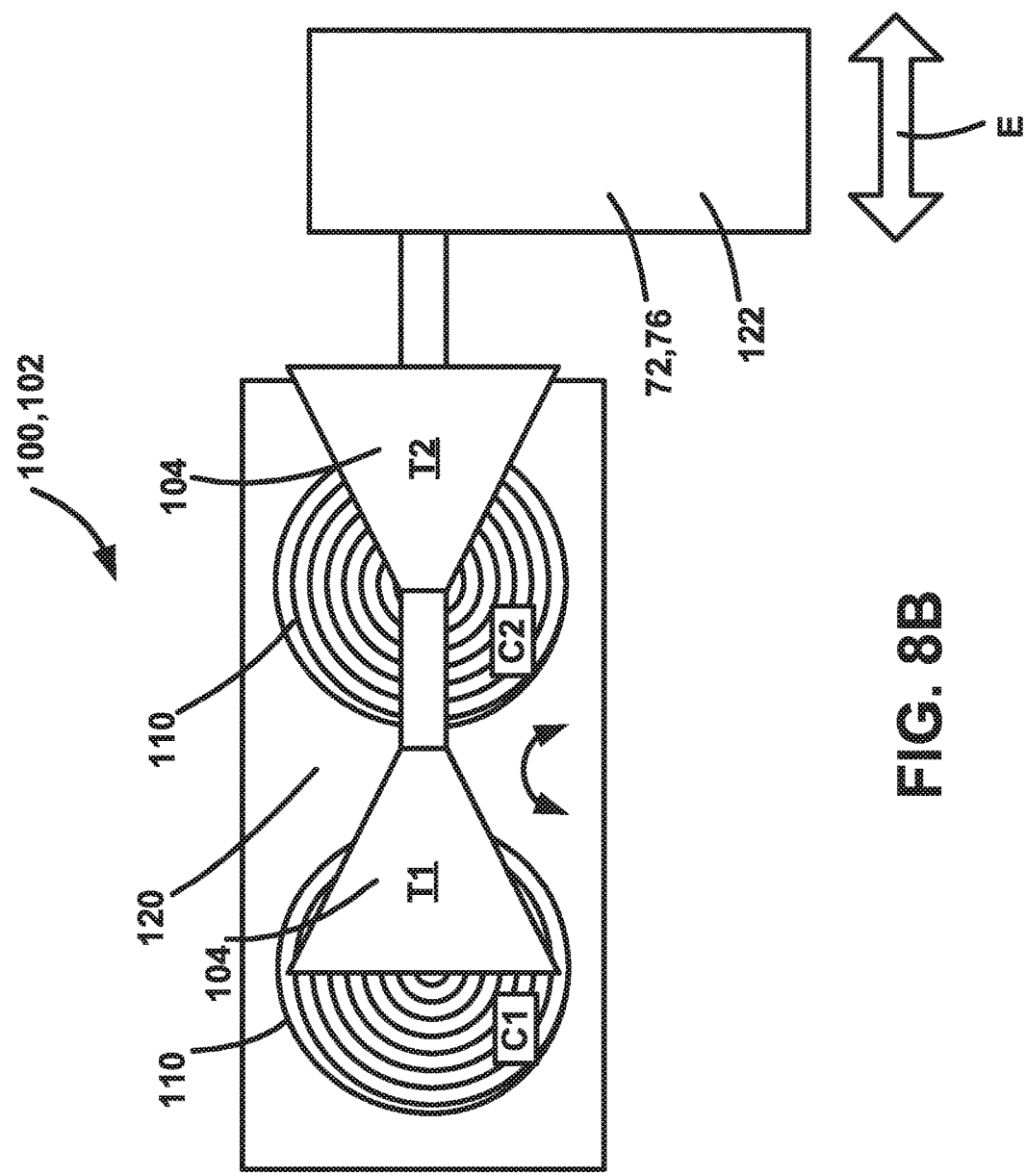

A similar sensor arrangement is illustrated in FIGS. 8A and 8B. The sensor 102 of FIGS. 8A and 8B is a differential sensor similar to the sensor of FIGS. 6A and 6B. In FIGS. 8A and 8B, the sensor 102 includes targets 104 and coils 110 that are arranged in series, as opposed to the parallel arrangement of FIGS. 6A and 6B. This can be advantageous, for example, in helping to avoid errors resulting from angular, rotational, twisting, or pivoting relative movement of vehicle and/or brake system components that can contribute to brake pad wear measurement errors. The selection of parallel or series is also dependent on the space availability.

Another advantage of using the series mode is that it can sense much wide range of the travel distance Ds. For example, there could be three different stages: Stage 1: Single target mode at beginning: T2 can be in the position of T1 over C1 as in FIG. 8A to start sensing. During this time, T1 will be outside of the coil C1 and C2 sensing range. Stage 2: Differential sense mode in the middle as shown in FIG. 8A. Stage 3: Single target mode at the end: T1 can be in the position of T2 over C2 in FIG. 8A to finish sensing. Off course, the benefit of the differential mode sensing is lost at the beginning and end stage where only one target is sensed.

The sensor system 100 of FIGS. 8A and 8B facilitates implementing differential inductance measurements in a manner similar or identical to that of the sensor system of FIGS. 6A and 6B. The sensor 102 is configured so that the coils 110 and their respective targets 104 provide inverse inductive measurements of the measured distance $D_s$, which is indicative of brake pad wear. To illustrate this, in FIGS. 8A and 8B, the coils 110 are labeled C1 and C2, and the targets are labeled T1 and T2, respectively.

The targets 104 are mirror mages of each other and are positioned generally centered and overlying their respective coils 110. As shown, the targets 104 can be interconnected with each other so that they move together as a single component. In the non-worn brake pad condition of FIG. 8A, the targets T1 and T2 are positioned generally centered and overlying their corresponding coils C1 and C2. In the fully-worn brake pad condition of FIG. 8B, the targets T1 and T2 are offset from their corresponding coils C1 and C2. Comparing these positions, it can be seen that, as the brake pad 72, 76 wears, the surface area of the target T1 centered over its coil C1 decreases, while the surface area of the target T2 centered over its coil C2 increases.

As the brake pad 72, 76 wears and gets thinner, both of the targets 104 move in the same direction relative to the coils 110. This movement produces a change in the inductance L1, L2 of the coils C1, C2, which is also illustrated in FIG. 7. In FIG. 7, the axis labeled $D_s$ shows brake pad wear increasing to the right along the axis. As shown in FIG. 7, increasing brake pad wear ($D_s$) results in decreased inductance L1 in the coil C1 (decreased target T1 surface area over coil C1), and increased inductance L2 in the coil C2 (increased target T2 surface area over coil C2). Through careful configuration of the targets 104 and coils 110, for any given amount of brake pad wear, the changes in inductance L1 and L2 can be made to be equal and opposite.

In operation, the sensor 102 can be configured to measure the change in inductance of coils C1 and C2 through the change in amplitude of the oscillator in the LC tank circuit or the change in resonating frequency of the LC tank circuit. Advantageously, sensing system 100 can be configured to measure brake pad wear as a differential between the two coils C1, C2. This can, for example, be as simple as measuring the difference between the measured inductances L1 and L2, or calculating a ratio of the measured inductances L1 and L2, and correlating that difference to brake pad wear.

Sources of error in the axial positions of the sensor system components, i.e., the coils 110 and targets 104, will affect the inductance L1, L2 in the coils equally and oppositely. For example, a shift of the targets T1 and T2 to the right in FIGS. 8A and 8B will cause a decrease in inductance L1 and an increase in inductance L2. A shift of the targets T1 and T2 to the left in FIGS. 8A and 8B will cause an increase in inductance L1 and a decrease in inductance L2. Furthermore, pivoting or rotation, indicated generally by the curved arrows in FIGS. 8A and 8B will not affect the differential reading, because the coils are circular and symmetrical, so pivoting movement tending to move one target 104 upward in FIGS. 8A and 8B, will result in equal and opposite downward movement of the other target. Therefore, the effect of this movement on the inductances L1, L2 of the coils C1, C2 will be the same, and the differential reading between the coils will be unaffected.

From the above description of the invention, those skilled in the art will perceive improvements, changes and modifications. Such improvements, changes and modifications within the skill of the art are intended to be covered by the appended claims.

We claim:

1. A brake pad wear measuring system for measuring brake pad wear for a vehicle disc brake system, comprising:
   a first coil excitable to create a first magnetic field, and a first target associated with the first coil, wherein the first coil and the first target are configured for movement relative to each other in response to application of the disc brake system, the relative movement causing the first target to move within the first magnetic field and affect an inductance of the first coil;
   a second coil excitable to create a second magnetic field, and a second target associated with the second coil, wherein the second coil and the second target are configured for movement relative to each other in response to application of the disc brake system, the relative movement causing the second target to move within the second magnetic field and affect the inductance of the second coil;
   wherein the first coil and the first target are configured so that the inductance of the first coil increases as brake pad wear increases, and wherein the second coil and the second target are configured so that the inductance of the second coil decreases as brake pad wear increases.

2. The brake pad wear measuring system recited in claim 1, further comprising a controller configured to excite the first and second coils to produce the first and second magnetic fields and for measuring the inductance of the first and second coils, wherein the controller is configured to respond to changes in inductance in the first and second coils caused by movement of the first and second targets target in the magnetic field to provide a signal indicative of brake pad wear.

3. The brake pad wear system recited in claim 2, wherein the controller is configured to calculate a differential between the inductance of the first coil and the inductance of the second coil, the controller being further configured to determine the brake pad wear in response to the calculated differential.

4. The brake pad wear system recited in claim 3, wherein the differential comprises a difference between the measured inductances of the first and second coils.

5. The brake pad wear system recited in claim 3, wherein the differential comprises a ratio of the measured inductances of the first and second coils.

6. The brake pad wear measuring system recited in claim 1, wherein:
   the first target has a face that extends along a first target plane and is oriented parallel with a first winding plane of the first coil;
   the second target has a face that extends along a second target plane and is oriented parallel with a second winding plane of the second coil;
   movement of the first target relative to the first coil is along an axis that extends parallel to both the first target plane and the first winding plane; and
   movement of the second target relative to the second coil is along an axis that extends parallel to both the second target plane and the second winding plane.

7. The brake pad wear measuring system recited in claim 6, wherein the first and second target planes are co-planar, and the first and second coil planes are co-planar.

8. The brake pad wear measuring system recited in claim 1, wherein the first and second targets are being configured so that a surface area of the first target overlying the first coil increases in response to brake pad wear, and a surface area of the second target overlying the second coil decreases in response to brake pad wear.

9. The brake pad wear measuring system recited in claim 8, wherein the first and second targets have tapered configurations.

10. A brake pad wear measuring system for measuring brake pad wear for a vehicle disc brake system, comprising:
    a sensor comprising a housing supporting a first coil excitable to create a first magnetic field, a second coil excitable to create a second magnetic field, and a controller configured to excite the first and second coils and to measure an inductance in the first and second coils;
    a first target configured to move within the first magnetic field and affect the inductance of the first coil in response to application of the disc brake system;
    a second target configured to move within the second magnetic field and affect the inductance of the second coil in response to application of the disc brake system;
    wherein the system is configured so that movement of the first target in response to brake pad wear causes the inductance of the first coil to increase as brake pad wear increases, and so that movement of the second target in response to brake pad wear causes the inductance of the second coil to decrease as brake pad wear increases.

11. The brake pad wear measuring system recited in claim 10, wherein the controller is configured to respond to changes in inductance in the first and second coils caused by movement of the first and second targets in the first and second magnetic fields to provide a signal from the sensor indicative of brake pad wear.

12. The brake pad wear system recited in claim 10, wherein the controller is configured to calculate a differential between the inductance of the first coil and the inductance of the second coil, the controller being further configured to determine the brake pad wear in response to the calculated differential.

13. The brake pad wear system recited in claim 12, wherein the differential comprises a difference between the measured inductances of the first and second coils.

14. The brake pad wear system recited in claim 12, wherein the differential comprises a ratio of the measured inductances of the first and second coils.

15. The brake pad wear measuring system recited in claim 10, wherein the first and second coils are arranged co-planar in the housing and the first and second targets are arranged co-planar and parallel to the plane of the first and second coils.

16. The brake pad wear measuring system recited in claim 10, wherein the first and second targets are configured so that a surface area of the first target overlying the first coil increases in response to brake pad wear, and a surface area of the second target overlying the second coil decreases in response to brake pad wear.

17. The brake pad wear measuring system recited in claim 16, wherein the first and second targets have tapered configurations.

* * * * *